(12) United States Patent
Kruger

(10) Patent No.: US 10,847,772 B2
(45) Date of Patent: Nov. 24, 2020

(54) BATTERY MODULE WITH THERMAL RUNAWAY AND GAS EXHAUST MANAGEMENT SYSTEM

(71) Applicant: TTB HOLDING COMPANY LIMITED, Surrey (CA)

(72) Inventor: Johannes Christian Kruger, Surrey (CA)

(73) Assignee: Sterling PBES Energy Solutions Ltd., Vancouver (CA)

( * ) Notice: Subject to any disclaimer, the term of this patent is extended or adjusted under 35 U.S.C. 154(b) by 0 days.

(21) Appl. No.: 16/270,790

(22) Filed: Feb. 8, 2019

(65) Prior Publication Data
US 2019/0173068 A1    Jun. 6, 2019

Related U.S. Application Data

(63) Continuation of application No. 15/555,746, filed as application No. PCT/CA2016/050236 on Mar. 4, 2016, now Pat. No. 10,243,186.

(Continued)

(51) Int. Cl.
| | |
|---|---|
| *H01M 2/12* | (2006.01) |
| *H01M 10/0525* | (2010.01) |
| *H01M 10/52* | (2006.01) |
| *H01M 10/625* | (2014.01) |
| *H01M 10/653* | (2014.01) |

(Continued)

(52) U.S. Cl.
CPC ....... *H01M 2/1223* (2013.01); *H01M 2/1229* (2013.01); *H01M 2/1252* (2013.01); *H01M 10/0525* (2013.01); *H01M 10/52* (2013.01); *H01M 10/625* (2015.04); *H01M 10/653* (2015.04); *H01M 10/655* (2015.04); *H01M 10/658* (2015.04); *H01M 2/1077* (2013.01); *H01M 2200/20* (2013.01)

(58) Field of Classification Search
CPC ....... H01M 2/12; H01M 2/1223; H01M 10/52
See application file for complete search history.

(56) References Cited

U.S. PATENT DOCUMENTS

| | | |
|---|---|---|
| 4,635,710 A | 1/1987 | Shelley |
| 5,344,723 A | 9/1994 | Bronoel et al. |
| | (Continued) | |

FOREIGN PATENT DOCUMENTS

| | | |
|---|---|---|
| CN | 201725824 | 1/2011 |
| CN | 204045659 | 12/2014 |
| | (Continued) | |

*Primary Examiner* — Matthew J Merkling
(74) *Attorney, Agent, or Firm* — Roni M. Jones; Oyen Wiggs Green & Mutala LLP

(57) ABSTRACT

Apparatus, methods and systems are provided for thermal runaway and gas exhaust management for high power batteries. A battery module has a plurality of cell-containing carriers stacked on top of one another to form a cell stack having a front end and a rear end. A duct extends through the cell stack between the front end and the rear end for collecting escaped gases from the battery cells. A self-closing one-way pressure relief valve is located in the duct toward the rear end of the cell stack. The pressure relief valve connects to a piping system for carrying the gases to a remote location where the gases can be safely released and dispersed.

20 Claims, 3 Drawing Sheets

Related U.S. Application Data

(60) Provisional application No. 62/129,116, filed on Mar. 6, 2015.

(51) Int. Cl.
   *H01M 10/655*   (2014.01)
   *H01M 10/658*   (2014.01)
   *H01M 2/10*     (2006.01)

(56) References Cited

U.S. PATENT DOCUMENTS

| | | | |
|---|---|---|---|
| 5,487,958 | A | 1/1996 | Tura |
| 6,709,783 | B2 | 3/2004 | Ogata et al. |
| 6,821,671 | B2 | 11/2004 | Hinton et al. |
| 7,297,438 | B2 | 11/2007 | Kimoto |
| 7,776,466 | B2 | 8/2010 | Oh |
| 8,057,933 | B2 | 11/2011 | Miyahisa et al. |
| 8,153,290 | B2 | 4/2012 | Hermann et al. |
| 8,197,958 | B2 | 6/2012 | Gaben et al. |
| 8,309,248 | B2 | 11/2012 | Koetting et al. |
| 8,343,650 | B2 | 1/2013 | Raiser |
| 8,349,478 | B2 | 1/2013 | Timmons et al. |
| 8,367,233 | B2 | 2/2013 | Hermann et al. |
| 8,404,375 | B2 | 3/2013 | Gaben |
| 8,557,416 | B2 | 10/2013 | Mardall et al. |
| 8,663,824 | B1 | 3/2014 | Frey et al. |
| 8,778,519 | B1 | 7/2014 | Frey et al. |
| 8,835,037 | B2 | 9/2014 | Nguyen et al. |
| 8,956,747 | B2 | 2/2015 | Itoi et al. |
| 2009/0155679 | A1 | 6/2009 | Zhu et al. |
| 2010/0052692 | A1 | 3/2010 | Yano et al. |
| 2010/0266883 | A1 | 10/2010 | Koetting et al. |
| 2011/0256446 | A1 | 10/2011 | Bronczyk et al. |
| 2012/0009455 | A1 | 1/2012 | Yoon |
| 2012/0100401 | A1 | 4/2012 | Yasui et al. |
| 2012/0231318 | A1 | 9/2012 | Buck et al. |
| 2012/0328916 | A1 | 12/2012 | Enning |
| 2013/0040175 | A1 | 2/2013 | Yang et al. |
| 2013/0071717 | A1 | 3/2013 | Muniz |
| 2013/0115506 | A1 | 5/2013 | Wayne et al. |
| 2013/0196211 | A1 | 8/2013 | Park et al. |
| 2013/0207459 | A1 | 8/2013 | Schröder et al. |
| 2013/0216887 | A1 | 8/2013 | Wayne et al. |
| 2013/0266838 | A1 | 10/2013 | Von Borck et al. |
| 2013/0330579 | A1 | 12/2013 | Ejiri et al. |
| 2014/0272513 | A1 | 9/2014 | Sun et al. |
| 2014/0302357 | A1 | 10/2014 | Tsuruta et al. |
| 2014/0335390 | A1 | 11/2014 | Hwang et al. |
| 2014/0349154 | A1 | 11/2014 | Nguyen et al. |
| 2015/0035370 | A1 | 2/2015 | Wyatt et al. |
| 2015/0093607 | A1 | 4/2015 | Kuriyama et al. |
| 2015/0125720 | A1* | 5/2015 | Fujii ............... H01M 2/1252 429/56 |
| 2016/0211497 | A1 | 7/2016 | Motokawa et al. |
| 2017/0331089 | A1 | 11/2017 | Hashimoto et al. |
| 2018/0034014 | A1 | 2/2018 | Ichikawa et al. |

FOREIGN PATENT DOCUMENTS

| | | |
|---|---|---|
| CN | 104409793 | 3/2015 |
| DE | 10 2011 053 439 | 1/2013 |
| DE | 10 2013 021 651 | 7/2014 |
| DE | 10 2013 213 909 | 1/2015 |
| JP | 07-326378 | 12/1995 |
| KR | 10-2011-0126764 | 11/2011 |
| KR | 10-2011-0126765 | 11/2011 |
| WO | 2013025608 | 2/2013 |
| WO | 2013/053386 | 4/2013 |
| WO | 2013/146562 | 10/2013 |
| WO | 2014/036227 | 3/2014 |

* cited by examiner

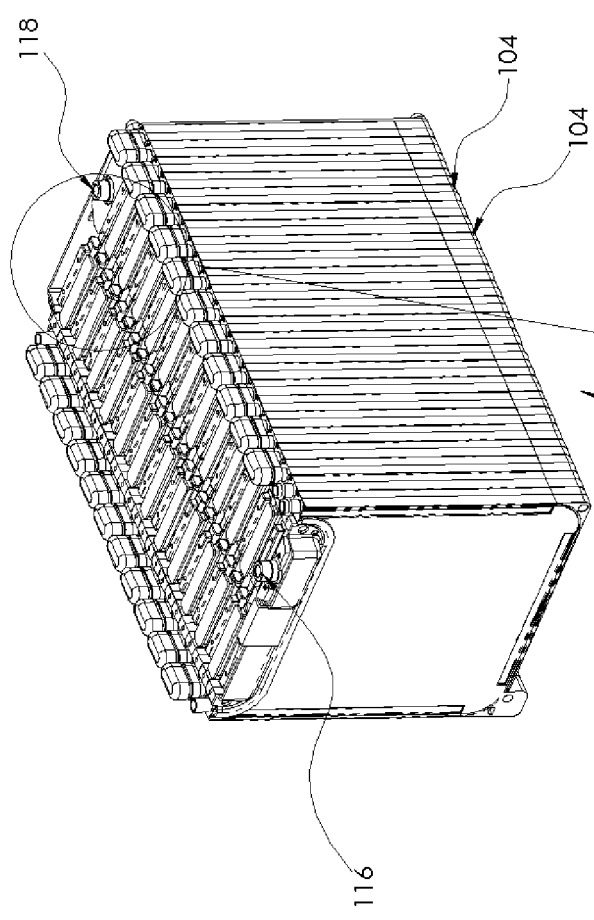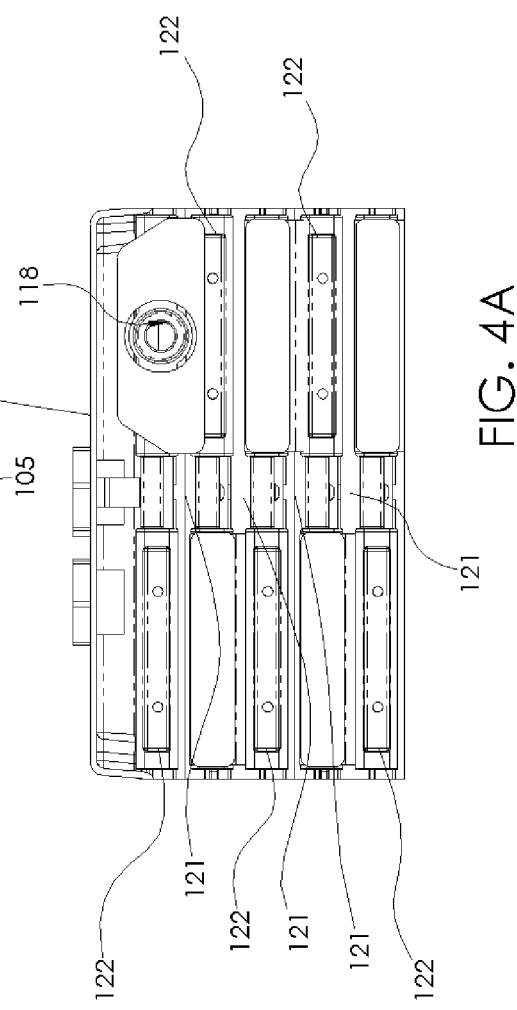

BATTERY MODULE WITH THERMAL RUNAWAY AND GAS EXHAUST MANAGEMENT SYSTEM

REFERENCE TO RELATED APPLICATIONS

This application is a continuation of U.S. application Ser. No. 15/555,746 having a 371 date of 5 Sep. 2017 entitled BATTERY MODULE WITH THERMAL RUNAWAY AND GAS EXHAUST MANAGEMENT SYSTEM, which itself is a national phase entry of PCT application No. PCT/CA2016/050236 entitled BATTERY MODULE WITH THERMAL RUNAWAY AND GAS EXHAUST MANAGEMENT SYSTEM having an international filing date of 4 Mar. 2016, which in turn claims priority from U.S. Application No. 62/129,116 filed on 6 Mar. 2015 and entitled BATTERY MODULE WITH THERMAL RUNAWAY AND GAS EXHAUST MANAGEMENT SYSTEM. All of the applications referred to in this paragraph are hereby incorporated herein by reference in their entirety.

TECHNICAL FIELD

The technology described herein relates to high power batteries, and apparatus, methods and systems for managing thermal runaway and gas exhaust from such batteries.

BACKGROUND

Thermal runaway in a battery occurs when rising battery cell temperatures initiate chain reactions that accelerate chemical reactions in the battery, further contributing to the rapid release of thermal energy. Thermal runaway may be triggered by insufficient cooling of battery cells during operation of the battery. Thermal runaway may also be triggered by other events, such as short circuits, mechanical shock, extreme temperature exposure, manufacturing defects, etc. During a thermal runaway event, hot gases and other flammable materials may escape from the battery cells. If not properly managed, the escaped gases may result in a fire or explosion.

High power lithium-ion batteries are often more prone to thermal runaway than other types of batteries. As such, there is a need for thermal runaway management systems for high-power lithium-ion batteries. There is a general desire for apparatus, systems and methods that assist with managing thermal runaway and gas exhaust from a battery cell, module and/or system.

SUMMARY

Aspects of the technology provide a thermal runaway and gas exhaust management system for a battery module. The battery module incorporates a plurality of cell-containing carriers stacked on top of one another to form a cell stack having a front end and a rear end. The thermal runaway and gas exhaust management system includes a duct extending along or through the cell stack between the front end and the rear end for collecting escaped gases from the battery cells. A pressure relief valve is placed in the duct toward the rear end of the cell stack. The pressure relief valve connects to a piping system for carrying the gases to a remote location. In certain embodiments, the pressure relief valve is a self-closing, one-way valve. The pressure relief valve may have an operating pressure of 7 kPa.

A top plate is placed over the cell stack, the top plate having a slot extending between front and rear ends of the cell stack for receiving the duct. The top plate is sealed to the cell stack by a gasket. The duct is sealed to the cell stack by a duct gasket. Gaskets are positioned between adjacent carriers to seal between the carriers.

Other aspects of the technology provide for methods of manufacturing a battery module incorporating a thermal runaway and gas exhaust management system. According to particular embodiments, the method consists of forming a cell stack and positioning a top plate over the cell stack, forming in the top plate a slot extending between front and rear ends of the cell stack, placing a duct within the slot, and placing a pressure relief valve in the duct toward the rear end of the cell stack. The pressure relief valve is connected to a piping system for carrying gases collected in the duct to a remote location. The pressure relief valve may be a self-closing, one-way valve.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIGS. 1, 2, 3, 4 and 4A illustrate a battery module incorporating a thermal runaway and gas exhaust management system according to one embodiment.

FIG. 1 shows the battery module assembled;

FIG. 2 is an exploded view showing more clearly aspects of the thermal runaway and gas exhaust management system;

FIG. 3 shows various components of the thermal runaway and gas exhaust management system located at the rear of the battery module;

FIG. 4 shows the battery module with the top plate; and

FIG. 4A is a detail view through a portion of the slot in the top plate, showing the spaces between cell carriers.

DESCRIPTION

Throughout the following description, specific details are set forth to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
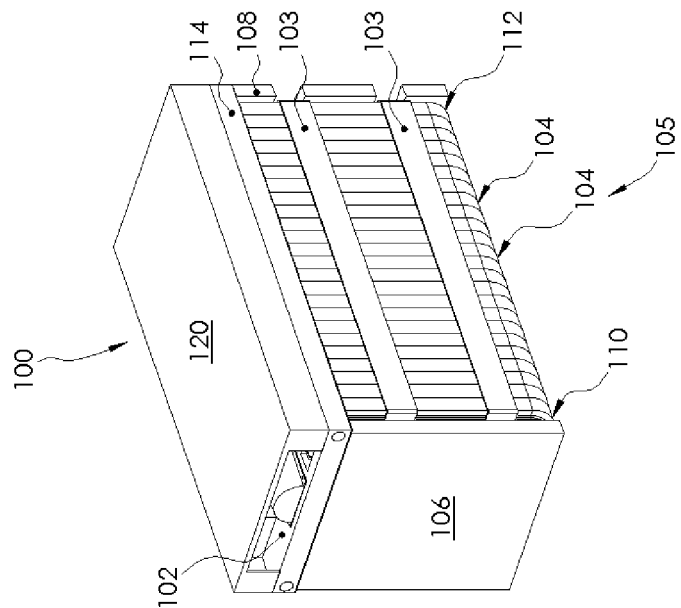

FIG. 1 shows a representative battery module 100 in which a thermal runaway and gas exhaust management system is incorporated. Battery module 100 consists of a plurality of stacked battery cells. The cells may be lithium-ion (Li-Ion) pouch cells or the like, or other types of flat battery cells, such as, for example, flat cells enclosed in metal cases. The cells can be stacked on top of one another (arranged parallel to one another) to make up a cell stack 105 for the battery module 100. Each battery cell may be contained in a cell carrier 104. Cell carriers 104 may be similar to the cell carriers described in the applicant's U.S. patent application No. 62/117,686 filed on Feb. 18, 2015 and the applicant's PCT patent application No. PCT/CA2016/050149 filed on Feb. 18, 2016, which are incorporated herein by reference in their entirety. In particular embodiments, the stacking of cell carriers 104 may be facilitated by interlocking features provided in the frame of the cell carriers 104. For example, each frame may incorporate complementary tongue and groove connections located on opposing sides of the frame for joining the cell carrier 104 to adjacent cell carriers 104. An O-ring or other gasket (not shown) may be inserted between adjacent cell carriers 104 to seal the connections between the cell carriers. The cell stack may be secured by straps 103, as shown, or by other means such as ties or rods. Electrically isolated end caps 106, 108 are provided to cap the cell stack 105's front end 110 and rear end 112 respectively. A top plate 114 is placed on top of the cell stack 105. Top plate 114 may function as a cooling plate. In such case top plate 114 may be made of aluminum, copper or any other suitable material with high thermal conductivity. Apertures 116, 118 are defined in top plate 114 near the cell stack 105's front and rear ends 110, 112, respectively (over the most positive and negative terminals of the cell stack, see FIG. 2) to allow for electrical power connections to outside of the module 100. The power connections can be connected to connectors at the cell stack 105's front end 112 by means of a power cable, flexible bus bar, or the like. An electrically isolated cap 120 is placed over the top plate 114 and the electrical connections to protect against electrical exposure. Cooling systems (not shown, apart from top plate 114) may be incorporated to cool the battery cells, their carriers 104 and module 100.

Figure 2:
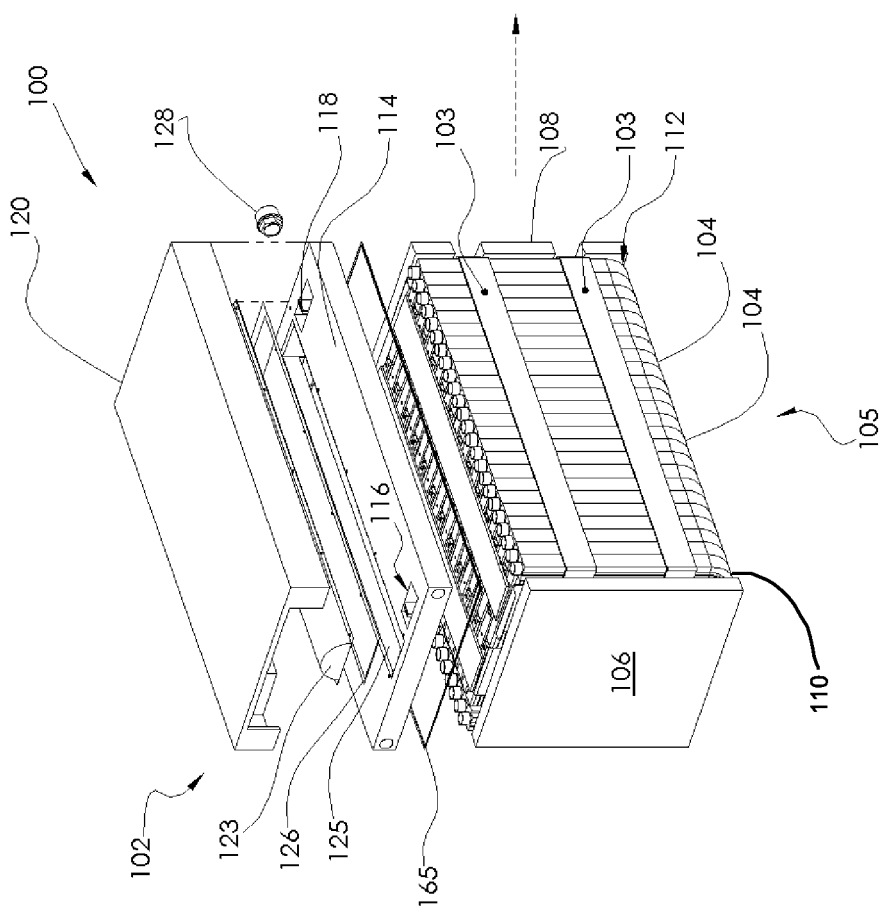

As best seen in the exploded view of FIG. 2, thermal runaway and gas exhaust management system 102 includes a gas exhaust or gas extraction duct 123 extending along a length of the cell stack (i.e. between front end 110 and rear end 112 of the battery module 100's cell stack 105). Duct 123 is received within a slot 125 defined through a center of the top plate 114, extending along the length of the cell stack 105. Duct 123 may be sealed to the top plate 114 by way of a duct gasket 126. The battery cell carriers 104 are sealed between each other by way of the sealed tongue and groove connections between adjacent carriers 104 (as described above). Top plate 114 is sealed to the cell stack by means of a gasket 165. In this manner, the stack of cell carriers 104 is completely enclosed and sealed off from the outside environment. A self-closing, one-way pressure relief valve 128 is placed in the duct 123 at the rear end 112 of battery module 100's cell stack 105. In particular embodiments, the operating pressure of valve 128 is 7 kPa (0.07 bar or 1 psi). As seem in FIG. 3, nozzle 130 is connected between valve 128 and a piping system 135. Piping system 135 consists of one or more pipes that lead to a location, remote from the battery installation, where the exhaust gases can be safely released and dispersed.

In some embodiments, the duct 123 connecting the cell carriers 104 in the cell stack 105 may be created by the space between the cell carriers 104 and the top plate 114. It may also be incorporated as a gas-conducting passage in the top plate 114 (e.g. the top plate 114 may be shaped to provide such a passage). In the illustrated embodiment, the duct 123 is a separate duct that is placed over the cell stack 105. The duct 123 is shown to be a semi-cylindrical (or approximately a semi-cylindrical) duct. In other embodiments, the duct 123 may have a different shape (e.g. round, oval or rectangular). The duct 123 is sized so as to be capable of removing the amount of gases typically generated during a thermal runaway event. In particular embodiments, for example, the duct 123 is semi-cylindrical in shape with a radius in the range of 2 to 5 cm.

In the event of a thermal runaway where a battery cell is compromised and flammable gases escape from the cell, the gases will be forced into and collected in duct 123. The accumulation of gases within a battery pouch cell will typically cause the pouch cell to open at the top. However, the pouch cell may also burst open at other locations on the pouch. The cell carrier 104 may be designed such that there is a gap between the battery pouch cell and the wall of the carrier 104 all around each pouch cell. Since there are seals between the carriers 104 the gasses released anywhere from the battery pouch cell will make their way to the top of the stack 105 and to the duct 123. The gases that escape from the pouch cell will be forced into the spaces 121 between the cell-containing carriers 104 and between the cell tabs 122 (see FIGS. 4, 4A), and will move past the cell tabs 122 and into duct 123. Valve 128 will open once enough gas has accumulated in duct 123 to increase the pressure in the duct to a first threshold level so as to trigger the opening of the valve (i.e. at the operating pressure of valve 128). The operating pressure of relief valve 128 may be low to allow any gas generated to be removed from the battery module 100. In particular embodiments, values for the operating pressure are in the range of 5 to 15 kPa (0.5 to 1.5 atmosphere), for example. Once valve 128 is opened, the gases that have been collected in duct 123 exit through the valve 128 into the piping system 135. Thus, duct 123 and one-way gas pressure relief valve 128 help to manage the gas exhaust from the battery cells by carrying the escaped gases out of battery module 100 and into a piping system 135. The piping system 135 then takes the gases to a remote location away from the battery installation where the gases can be safely released and dispersed. The distance at which the exhaust gases are carried before being released may depend on the application and environment. For example, in a boat, the gases may be transported a few meters to the smoke stack. On land, the gases may be transported several 10 s of meters to a location remote from any people. The thermal runaway and gas exhaust management system 102 prevents the gases from being released in or around the battery module 100 where they could otherwise cause a fire or explosion. In addition, once the gases have safely exited the battery module 100 and moved into the piping system 135, the pressure in duct 123 is decreased below a second threshold level, causing valve 128 to close. In particular embodiments, the valve 128 is spring loaded, and it will open as soon as the pressure is above the spring holding pressure and close again when it drops below that pressure (thus in such embodiments the first and second threshold levels of pressure are equal or approximately equal). The closing of valve 128 prevents the return flow of oxygen to battery module 100 therefore ensuring the thermal runaway process remains starved of oxygen. The closing of valve 128 also ensures that the thermal runaway exhaust gases do not re-enter the duct 123 where they could heat and affect the performance of the battery cells in the cell stack 105. Any components exposed to the hot gases, such as the gas extraction duct 123, pressure relief valve 128 and piping system 135 may be made of aluminum, steel or stainless steel, or any other suitable material that is heat resistant. In particular embodiments, the components are heat resistant up to 400° C. In other embodiments the components are heat resistant up to temperatures above 400° C.

In some embodiments, gas extraction duct 123 is omitted. A gas exhaust passage may be formed or provided in top plate 114 providing a similar function to gas extraction duct 123. Pressure relief valve 128 may be placed in the gas exhaust passage at or near end cap 108. End cap 108 may be made of metal in some embodiments. In other embodiments, gas extraction duct 123 is formed as part of the rack carrying the battery modules.

Where a component (e.g. cell, pouch cell, battery module, gasket, duct, pipe, valve, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

Figure 3:
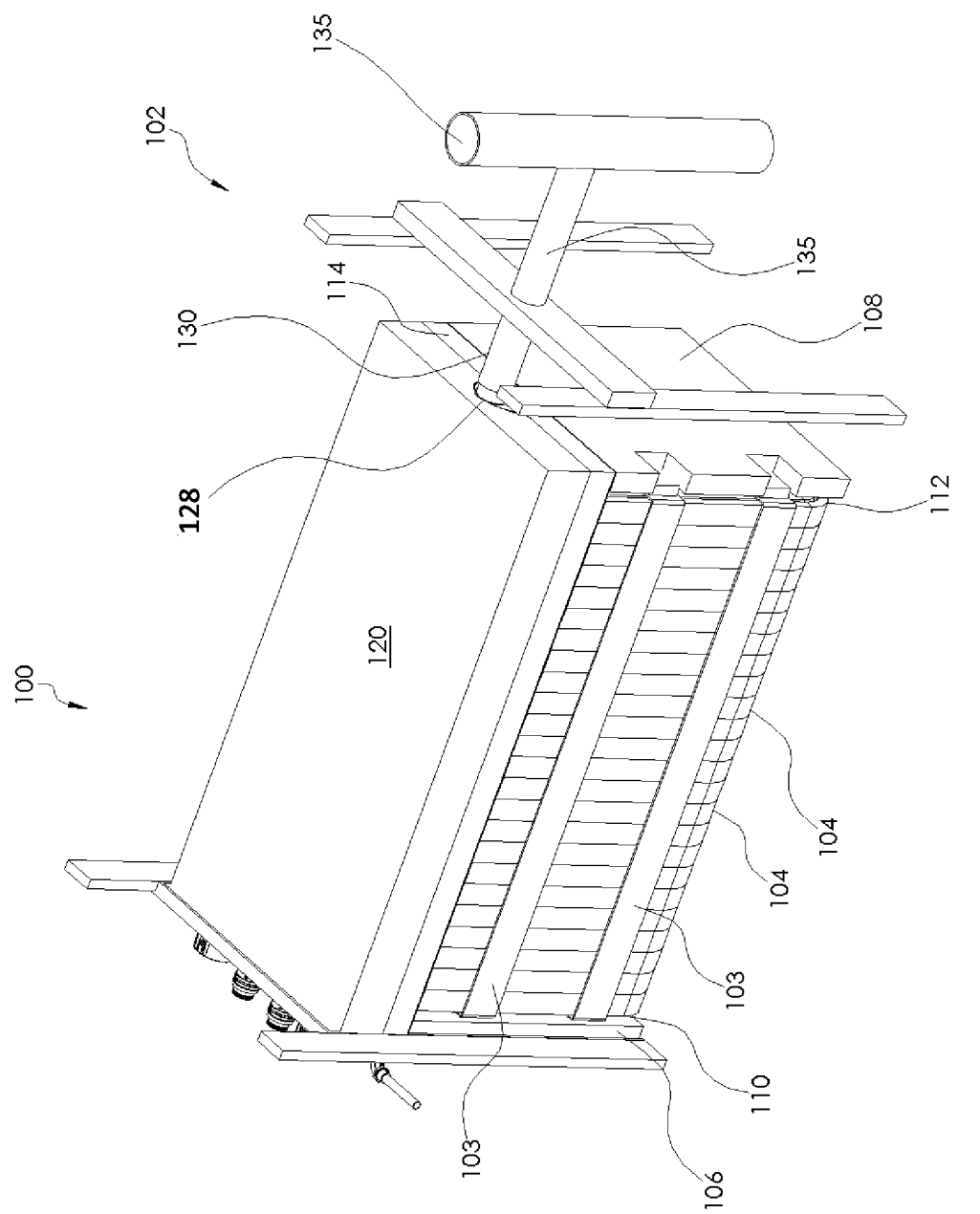

While a number of exemplary aspects and embodiments have been discussed above, those of skill in the art will recognize certain modifications, permutations, additions and sub-combinations thereof. For example:

The illustrated embodiment of battery module 100 is representative of a battery module for which a thermal runaway and gas exhaust management system 102 can be provided according to embodiments of the invention. However, it is not necessary that battery module 100 have all of the features as shown and described. As will be appreciated by one of skill in the art, other embodiments of the thermal runaway and gas exhaust management system 102 described herein may work with other types of battery modules having features that are different from the ones that are described. For example, in other embodiments for which thermal runaway and gas exhaust management system 102 is provided, battery module 100 may be of the type that has stacked battery cells that are held together by and housed within an enclosure (as opposed to having interlocking cell carriers or cell carriers that are secured together using straps as shown in FIGS. 1-3). In some embodiments, battery module 100 may incorporate other types of cells such as cylindrical 18650 or 27650 cells or prismatic cells, which may be housed in an enclosure of any shape or size. Thermal runaway and gas exhaust management system 102 including a gas extraction duct 123 and self-closing, one-way pressure relief valve 128 may be incorporated into such battery modules 100 to move hot gases into a gas exhaust piping system 135 and away from the module.

More than one battery module 100 can be housed in a single enclosure. In such embodiment, the enclosure may contain a pressure relieve valve 128 for managing the movement of gases from a gas extraction duct 123 extending through one or more of the battery modules 100. The gas extraction duct 123 connects, by way of the pressure relief valve 128 and a nozzle 130, to a gas exhaust piping system 135 for carrying the hot gases to a remote burn-off location.

It is not necessary that the pressure relieve valve 128 be located at the rear of the battery module 100 as shown in the illustrated embodiment. In other embodiments, pressure relief valve 128 may be located at a side, top, and/or center of the battery module 100, for example.

In some embodiments, more than one duct 123 may be provided in each battery module 100 to collect the exhaust gases from battery cells. For example, two or more ducts 123 may be aligned parallel to one another and extend along a length of the cell stack.

It is therefore intended that the scope of the following appended claims and claims hereafter introduced should not be limited by the embodiments set forth in the examples, but should be given the broadest interpretation consistent with the description as a whole.

What is claimed is:

1. A battery module comprising:
   a plurality of carriers stacked on top of one another to form a cell stack having a front end and a rear end, each of the carriers containing a battery cell;
   a duct extending adjacent to the cell stack between the front end and the rear end for collecting escaped gases from the battery cells; and
   a pressure relief valve placed in the duct toward the rear end of the cell stack.

2. The battery module of claim 1 wherein the pressure relief valve connects to a piping system for carrying the gases to a remote location.

3. The battery module of either one of claim 1 wherein the pressure relief valve is a self-closing, one-way valve.

4. The battery module of any one of claim 1 wherein the pressure relief valve has an operating pressure of 7 kPa.

5. The battery module of any one of claim 1 comprising a top plate placed over the cell stack, the top plate having a slot extending between front and rear ends of the cell stack for receiving the duct.

6. The battery module of claim 5 wherein the top plate is sealed to the cell stack by a gasket.

7. The battery module of any one of claim 1 wherein each carrier is sealed to an adjacent carrier by way of an inter-carrier gasket.

8. The battery module of any one of claim 1 wherein the duct is sealed to the cell stack by a duct gasket.

9. The battery module of any one of claim 1 wherein the battery cell of each carrier comprises a flat battery cell.

10. The battery module of claim 9 wherein the battery cell of each carrier comprises a lithium-ion pouch cell.

11. The battery module of any one of claim 1 wherein the cell stack comprises 24 battery cells.

12. A battery system comprising:
    a battery module in accordance with claim 1; and
    a gas exhaust piping subsystem connected to the pressure relief valve of the battery module.

13. A battery module comprising:
    a plurality of carriers stacked on top of one another to form a cell stack having a front end and a rear end, each of the carriers containing a battery cell;
    a duct extending on top of the cell stack between the front end and the rear end for collecting escaped gases from the battery cells; and
    a pressure relief valve placed in the duct toward the rear end of the cell stack.

14. The battery module of claim 13 wherein the pressure relief valve connects to a piping system for carrying the gases to a remote location.

15. The battery module of either one of claim 13 wherein the pressure relief valve is a self-closing, one-way valve.

16. The battery module of any one of claim 13 wherein the pressure relief valve has an operating pressure of 7 kPa.

17. The battery module of any one of claim 13 comprising a top plate placed over the cell stack, the top plate having a slot extending between front and rear ends of the cell stack for receiving the duct.

18. The battery module of any one of claim 13 wherein the battery cell of each carrier comprises a flat battery cell.

19. The battery module of claim 18 wherein the battery cell of each carrier comprises a lithium-ion pouch cell.

20. A battery system comprising:
    a battery module in accordance with claim 13; and
    a gas exhaust piping subsystem connected to the pressure relief valve of the battery module.

* * * * *